United States Patent
Fischer et al.

(10) Patent No.: US 9,174,553 B2
(45) Date of Patent: Nov. 3, 2015

(54) SEAT HAVING A WELDED TRANSVERSE SHAFT

(71) Applicant: BROSE FAHRZEUGTEILE GMBH & CO. KOMMANDITGESELLSCHAFT, COBURG, Coburg (DE)

(72) Inventors: Matthias Fischer, Kronach (DE); Jochen Hofmann, Marktgraitz (DE); Nadine Reinhardt, Sonnefeld (DE); Michael Flieger, Coburg (DE); Jörg Gropp, Böhlen (DE)

(73) Assignee: Brose Fahrzeugteile GmbH & Co. Kommanditgesellschaft, Coburg, Coburg (DE)

( * ) Notice: Subject to any disclaimer, the term of this patent is extended or adjusted under 35 U.S.C. 154(b) by 0 days.

(21) Appl. No.: 14/352,658

(22) PCT Filed: Oct. 11, 2012

(86) PCT No.: PCT/EP2012/004263
§ 371 (c)(1),
(2) Date: Apr. 17, 2014

(87) PCT Pub. No.: WO2013/056798
PCT Pub. Date: Apr. 25, 2013

(65) Prior Publication Data
US 2014/0252833 A1 Sep. 11, 2014

(30) Foreign Application Priority Data
Oct. 19, 2011 (DE) .......................... 10 2011 054 608

(51) Int. Cl.
*B60N 2/22* (2006.01)
*B60N 2/68* (2006.01)
*B60N 2/235* (2006.01)

(52) U.S. Cl.
CPC .. *B60N 2/22* (2013.01); *B60N 2/68* (2013.01); *B60N 2/682* (2013.01); *B60N 2/2356* (2013.01); *B60N 2205/50* (2013.01)

(58) Field of Classification Search
CPC ........ B60N 2/2356; B60N 2/682; B60N 2/20; B60N 2/22; B60N 2/68; B60N 2205/50
USPC ........................................... 297/354.1, 354.12
See application file for complete search history.

(56) References Cited

U.S. PATENT DOCUMENTS 4,505,515 A    3/1985   Wilking et al.
4,768,594 A *  9/1988   Akkerman ................... 166/319
(Continued)

FOREIGN PATENT DOCUMENTS

DE    31 30 313 A1    2/1983
DE    31 30 315 A1    2/1983
(Continued)

OTHER PUBLICATIONS

International Search Report corresponding to PCT/EP2012/004263, dated Apr. 16, 2013, 6 pages.
(Continued)

*Primary Examiner* — Joshua J Michener
*Assistant Examiner* — Matthew Gitlin
(74) *Attorney, Agent, or Firm* — Christie, Parker & Hale, LLP

(57) ABSTRACT

A seat, in particular motor vehicle seat, with a seat part and a backrest pivotally mounted relative to the seat part, which includes a backrest frame with two mutually opposite side bars, is provided. The two side bars are connected with each other via a transverse shaft which is rotatably mounted on the seat part in the region of a side bar. At least one fitting arrangement with a fitting part fixed at the backrest frame is provided, in order to arrest the pivotally mounted backrest relative to the seat part. The fitting part fixed at the backrest frame is welded to one of the side bars and the transverse shaft is welded to this fitting part. An end of the transverse shaft extends through one of the two side bars and this end is rotatably mounted in a seat side part of the seat part, so that the transverse shaft defines a pivot axis about which the backrest is pivotable relative to the seat part.

17 Claims, 4 Drawing Sheets

(56) References Cited

U.S. PATENT DOCUMENTS

| | | | |
|---|---|---|---|
| 5,988,756 A | 11/1999 | Aufrere et al. | |
| 6,779,841 B2 | 8/2004 | Eckendorff | |
| 6,799,806 B2* | 10/2004 | Eppert et al. | 297/463.1 |
| 2007/0145801 A1* | 6/2007 | Yamada et al. | 297/369 |
| 2007/0182228 A1* | 8/2007 | Elio et al. | 297/354.12 |
| 2007/0200408 A1* | 8/2007 | Ohta et al. | 297/362.11 |
| 2010/0231021 A1* | 9/2010 | Myers et al. | 297/354.12 |
| 2011/0121627 A1* | 5/2011 | Konagai et al. | 297/354.1 |
| 2011/0121629 A1* | 5/2011 | Roth et al. | 297/354.12 |
| 2011/0204691 A1 | 8/2011 | Schuhmacher et al. | |

FOREIGN PATENT DOCUMENTS

| | | |
|---|---|---|
| DE | 10 2004 061 062 A1 | 6/2006 |
| DE | 10 2009 031 581 A1 | 1/2011 |
| EP | 1 057 690 A2 | 12/2000 |
| FR | 2 772 320 A1 | 6/1999 |
| JP | 2003-289973 A | 10/2003 |
| JP | 2011-230728 A | 11/2011 |
| WO | WO 2010/081508 A1 | 7/2010 |

OTHER PUBLICATIONS

English translation of International Preliminary Report on Patentability and Written Opinion for International Application No. PCT/EP2012/004263, dated Apr. 22, 2014, (6 sheets).

English translation of excerpts from German Examination report for application No. 11 2012 004 351.0, dated Jun. 26, 2014.

* cited by examiner

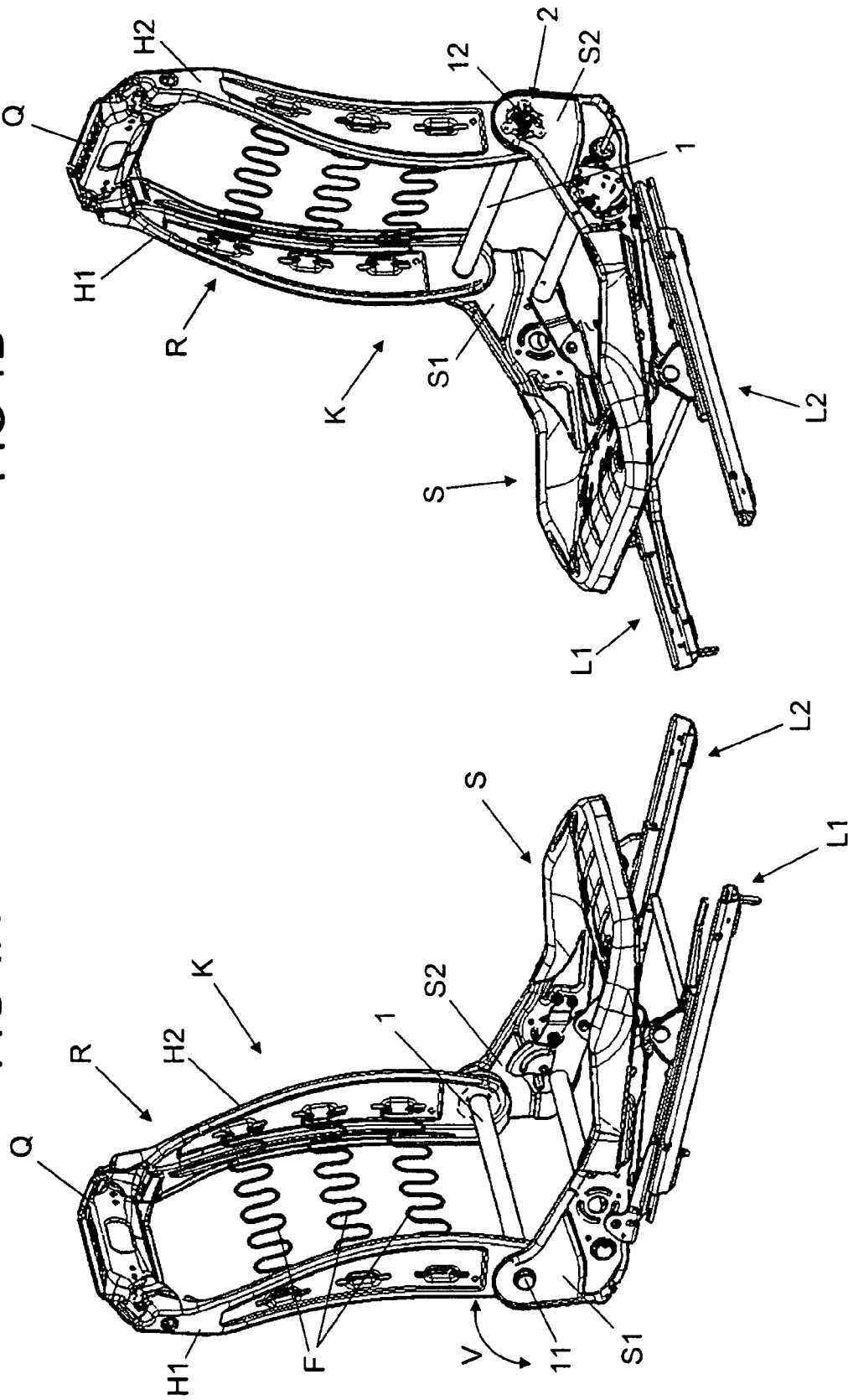

SEAT HAVING A WELDED TRANSVERSE SHAFT

CROSS-REFERENCE TO A RELATED APPLICATION

This application is a National Phase Patent Application of International Patent Application Number PCT/EP2012/004263, filed on Oct. 11, 2012, which claims priority of German Patent Application Number 10 2011 054 608.1, filed on Oct. 19, 2011.

BACKGROUND

The present invention relates to a seat, in particular a motor vehicle seat.

Such seat includes a seat part and a backrest pivotally mounted relative to the seat part, so that an inclination of the backrest relative to the seat part can be adjusted. To be able to arrest the backrest in an adjusted relative position with respect to the seat part, a fitting arrangement is provided. Such fitting arrangement usually includes two fitting parts, for example as part of detent fittings. One fitting part here is fixed at a backrest frame of the backrest carrying a backrest cushion and the other fitting part is fixed at the seat part. For example, via locking elements provided inside the fitting arrangement the two fitting parts and hence the backrest can be arrested relative to the seat part. By actuating the locking elements, the arrestment can be released again, so that the backrest can be varied in its inclination relative to the seat part. There can also be provided an adjusting element for example in the form of a hand wheel or an adjusting lever at the fitting arrangement, in order to pivot the backrest.

Furthermore, it is known in such seats to rigidly connect two mutually opposite side bars of a backrest frame of the backrest with each other via a transverse shaft. The transverse shaft here above all serves for absorbing forces and moments acting on the backrest. The transverse shaft possibly can also be utilized for the definition of a pivot axis, about which the backrest is pivotally mounted. For this purpose, at least one of the side bars of the backrest frame is non-rotatably connected with the transverse shaft and the transverse shaft is rotatably mounted on the seat part. Via the transverse shaft, the backrest thus is pivotally mounted on the seat part about a pivot axis. Alternatively, additional components, such as for example weld nuts, stepped pins or inlay sheets can be used for specifying the pivot axis.

At an end of the transverse shaft, the fitting arrangement furthermore can be provided. A fitting arrangement furthermore can include the adjusting element via which the backrest can be rotated about its pivot axis, in order to (manually) pivot the backrest relative to the seat part.

Usually, a transverse shaft connecting the two side bars of a backrest frame is connected with a fitting part of the fitting arrangement via additional components, such as for example sheets. This does not only increase the costs, but also the weight of the seat, the assembly expenditure and the assembly time. Moreover, by using such additional components a force can be transmitted only indirectly between the backrest frame and the transverse shaft.

SUMMARY

Therefore, it is an object of the present invention to further improve a seat, in particular a motor vehicle seat as mentioned above and to reduce the expenditure for the assembly of such seat.

According to an exemplary embodiment of the invention, at the backrest frame of the pivotally mounted backrest, which includes the two mutually opposite side bars defining the backrest long sides, a fitting part of the fitting arrangement is directly fixed at one of the side bars via a weld. In addition, the transverse shaft connecting the two side bars is welded to this fitting part and with one end reaches through one of the two side bars, so that with this end the transverse shaft is rotatably mounted in a seat side part of the seat part and defines the pivot axis about which the backrest is pivotable relative to the seat part.

In this way, the transverse shaft not only serves as pivot axis for the backrest or as backrest pivot point, but there is also ensured a direct flux of force between the transverse shaft, the one fitting part and the one side bar of the backrest frame. Accordingly, no further components are necessary for the connection of transverse shaft and fitting part and of fitting part and the one side bar.

The backrest frame non-rotatably connected with the transverse shaft extends between two seat side parts of the seat part, wherein one end of the transverse shaft is accommodated in a pivot bearing of a seat side part. Preferably, the two seat side parts here each are formed at the seat part like side bolsters, so that a seat cushion arranged at the seat part is laterally enclosed by the two seat side parts. At one of these seat side parts there can also be fixed a second fitting part of the fitting arrangement.

In one exemplary design variant, the transverse shaft is cohesively connected both with one (first) of the two side bars and with the fitting part fixed at the other (second) opposite side bar, wherein this fitting part—preferably exclusively—is cohesively connected with the other (second) side bar.

In another exemplary design variant, a separate connecting element is fixed at the side bar reached through by the transverse shaft—preferably by a weld—and the transverse shaft is non-rotatably connected with this side bar via the separate connecting element. In this variant it likewise is preferred that the transverse shaft is welded to the connecting element, in order to produce a loadable connection at low cost.

Due to the formation of the seat according to the invention not only the weight of the seat and its manufacturing and assembly costs can be reduced, but there is also achieved an improved power transmission which especially in the case of a crash is particularly important, when the transverse shaft must absorb large torques.

A further exemplary advantage of the invention consists in that for supporting the backrest on the seat side part (on the side of the backrest remote from the fitting) no additional component is required, but the transverse shaft itself also serves as bearing. In addition, the transverse shaft serving for reinforcement in particular should counteract a torsion of the backrest, wherein for this purpose its direct (via a separate connecting element) or indirect, cohesive connection to a side bar and the cohesive connection to the opposite fitting part welded to the other side bar has a particularly advantageous effect.

In a preferred design variant, the fitting part fixed at the one (second) side bar is formed disk-like and in particular connected with the transverse shaft such that a welding seam for connecting the fitting part with the side bar substantially lies in the same plane as a welding seam for connecting the transverse shaft with the fitting part. A slight axial offset between the two different welding seams here at best is obtained due to the thickness of the fitting part, in that the fitting part is welded to the associated side bar on the same side on its outer circumference and is welded to the transverse shaft at an inner edge of an opening through which the transverse shaft engages into the fitting part. Preferably, a disk-like fitting part has a thickness of only few millimeters.

By using a substantially disk-like fitting part and by welding the fitting part to the one side bar and the transverse shaft to the fitting part substantially in the same plane, a direct flux of force between transverse shaft and side bar is supported further. A force to be transmitted thus is passed on via the fitting part relative to the transverse shaft almost exclusively radially (to the outside from the transverse shaft into the side bar or to the inside from the side bar into the transverse shaft). For example, a force to be transmitted from the transverse shaft to the one side bar with the fitting part is diverted by about 90° via the disk-like fitting part and introduced into the side bar extending vertically to the transverse shaft.

In this connection it likewise is preferred when a used connecting element is formed disk-like.

Furthermore, it is regarded as advantageous that the fitting part and/or a connecting element has dimensions in radial direction greater by a multiple than the transverse shaft, i.e. in particular the fitting part or the connecting element has at least one portion or several portions extending in radial direction away from the transverse shaft or extending to the outside. A portion extending radially to the outside then preferably is also welded to the associated side bar. A radial offset thereby is achieved between one or more welded connections of transverse shaft and fitting part or of transverse shaft and connecting element and of one or more welded connections of fitting part and associated side bar or connecting element and associated side bar.

As already explained above, the fitting part here in particular can be formed disk-like, whereby—in particular in the case of a crash—occurring forces and torques are introduced better into the transverse shaft by the backrest frame. Due to the disk-like formation of the fitting part, a (greater) axial offset between the welded connection of fitting part and side bar on the one hand and between the welded connection of fitting part and transverse shaft on the other hand is avoided. Due to a force which is to be transmitted from the side bar via the fitting part to the transverse shaft, such axial offset would produce a torque which would (additionally) load the welded connection of fitting part and transverse shaft. Furthermore, a radial offset between the welded connections referred to above thereby is provided in one exemplary embodiment. Due to this provided radial offset of the welded connections, a force to be transmitted from the side bar to the transverse shaft or a torque to be transmitted is passed over the portion or portions of the fitting part extending radially in direction of the transverse shaft. Before being introduced into the transverse shaft, a force acting on the backrest or a torque acting thereon thereby are guided along the backrest frame in direction of longitudinal extension of the backrest frame and selectively over a region of the side bar equipped with the fitting part, which is reinforced by the fitting part.

Advantageously, the welding of the transverse shaft each is effected on the inside of the side bar facing the other side bar. Thus, for example the welding seams between transverse shaft and the one, first side bar on the one hand and the fitting part on the other hand each are provided within the backrest frame and hence are easily accessible during the assembly.

Analogously, in one exemplary design variant in which a connecting element is provided for connecting the transverse shaft with the one first side bar the transverse shaft is welded to the connecting element on an inside of this first side bar and is welded to the fitting part on an opposite inside of the second side bar.

In a development based thereon it furthermore is provided to weld the connecting element on an inside of the first side bar to the transverse shaft and on an outside of the same first side bar to the first side bar. Welding seams for fixing the connecting element at the side bar on the one hand and for fixing the transverse shaft at the connecting element on the other hand thus are made on different sides of the side bar.

In one exemplary embodiment, the transverse shaft via an individual, in particular radially extending welding seam is welded to the one side bar and/or via an individual, in particular radially extending welding seam is welded to the axially opposite fitting part. Alternatively, it can of course also be provided that a cohesive connection of the transverse shaft with the first side bar or the fitting part is realized via several (at least two) welding seams spaced from each other along an outer circumference of the transverse shaft.

When using a connecting element, the transverse shaft likewise can be welded to the connecting element via an individual, in particular radially extending welding seam or via several welding seams spaced from each other along an outer circumference of the transverse shaft.

It is of course conceivable to provide a direct weld between transverse shaft and the first side bar not provided with the fitting part as well as additionally a weld of the transverse shaft with the connecting element fixed at the same first side bar, as is e.g. also indicated in the sub-claims. In particular due to the faster assembly as a result of a smaller number of welding seams it is preferred, however, to exclusively weld the transverse shaft to the connecting element, when a connecting element is used, so that the transverse shaft is non-rotatably connected with the first side bar only via the connecting element.

In one exemplary embodiment, the transverse shaft is introduced into a rim hole formed at the one, first side bar and is welded to this rim hole. An edge of the rim hole axially protrudes in direction of the opposite side bar, so that welding to a shell surface of the transverse shaft is facilitated.

In one exemplary embodiment, the two side bars in addition to the transverse shaft exclusively also are rigidly connected with each other via an upper transverse bar. The upper transverse bar is formed and provided for fixing a headrest of the (vehicle) seat. Between the two side bars there can likewise also be arranged elastic spring elements or a spring mat for supporting a backrest cushion. In such exemplary embodiment, however, a rigid, reinforcing connection between the two side bars exclusively is provided by an upper transverse bar and the one transverse shaft.

To design the seat lighter in weight, it furthermore is preferred to form the transverse shaft as hollow transverse tube. The cross-sectional shape of the transverse shaft preferably is circular or rectangular.

With regard to the fitting part welded to the one (second) side bar it can be provided that the same is part of a rotary fitting of the fitting arrangement or of a detent fitting of the fitting arrangement, by means of which a swivel movement of the backrest relative to the seat part is blocked and can be released by actuating an actuating element.

In both cases, the fitting part welded to the one side bar is a part of a fitting arrangement, via which the pivotally mounted backrest can be arrested relative to the seat part and only by a selective actuation (manually or by motor) can be adjusted in its inclination relative to the seat part. The present invention here proceeds from the idea that the transverse shaft coupled with the fitting arrangement at low cost both can cohesively be connected directly with a side bar of the backrest frame and can cohesively be connected directly with a fitting part of the fitting arrangement, in order to reduce the use of additional components and provide a rather direct flux of force between transverse shaft and backrest frame. Correspondingly, the fitting part welded to the transverse shaft also is welded to the associated side bar of the backrest frame.

BRIEF DESCRIPTION OF THE DRAWINGS

Further advantages of the present invention will become apparent from the following description of an exemplary embodiment with reference to the Figures.

FIGS. 1A-1B show an exemplary embodiment of a motor vehicle seat according to the invention in a perspective view looking at the two mutually opposite backrest long sides.

DETAILED DESCRIPTION

FIGS. 1A and 1B initially show a perspective view of a motor vehicle seat K with a seat part S on which a seat cushion is to be arranged, and with a backrest R pivotally mounted relative to the seat part S. The seat part S here is longitudinally shiftably mountable inside a motor vehicle in a known manner via a pair of sliding rails L1, L2.

The backrest R is pivotally mounted on bolster-like seat side parts S1, S2 of the seat part S, so that the backrest R can be varied in its inclination relative to the seat part S in swivel directions V. The backrest R here is shown without a backrest cushion to be arranged thereon, so that a backrest frame formed of two mutually opposite side bars H1 and H2 and an upper transverse bar Q can be seen.

The two side bars H1 and H2 define the backrest long sides of the backrest R. The transverse bar Q rigidly connects the two side bars H1 and H2 with each other and is formed and provided for fixing a non-illustrated headrest of the motor vehicle seat K. Between the two side bars H1 and H2 several (here three) spring elements F extend transversely to a backrest longitudinal direction defined by the two longitudinally extending side bars H1 and H2. Via these elastically formed spring elements F a backrest cushion arranged on the backrest frame can elastically be supported.

Figure 2A:
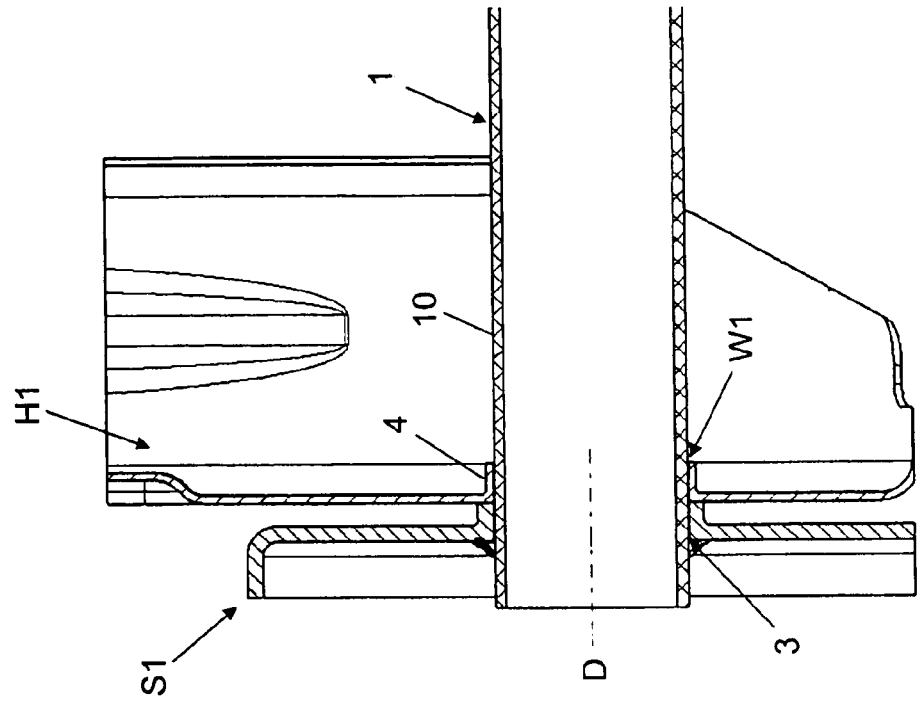
FIGS. 2A-2C show detail views of a first backrest long side of the motor vehicle seat of FIGS. 1A and 1B with a first side bar of a backrest frame, which is welded to a transverse shaft.
Figure 2B:
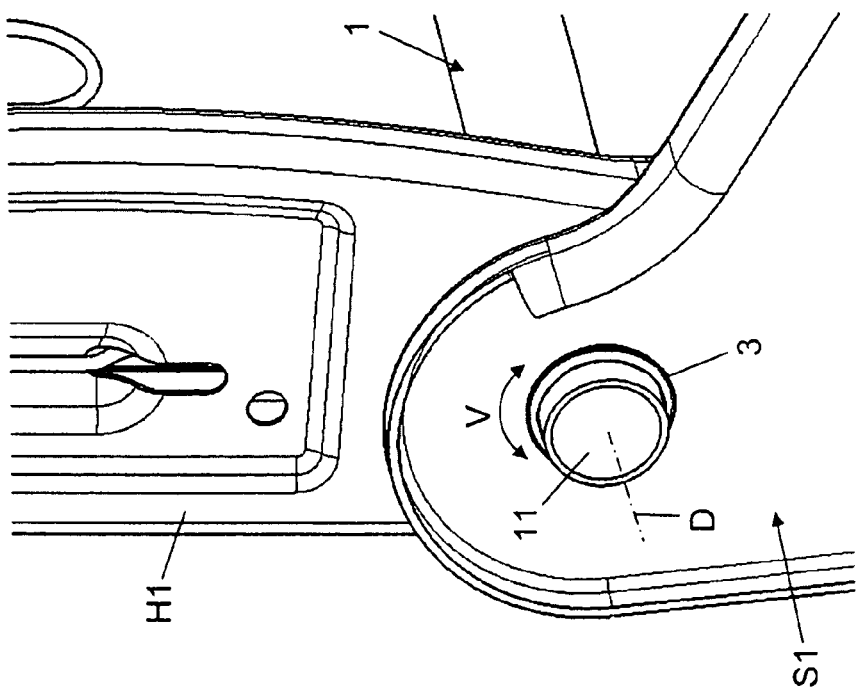
Figure 3:
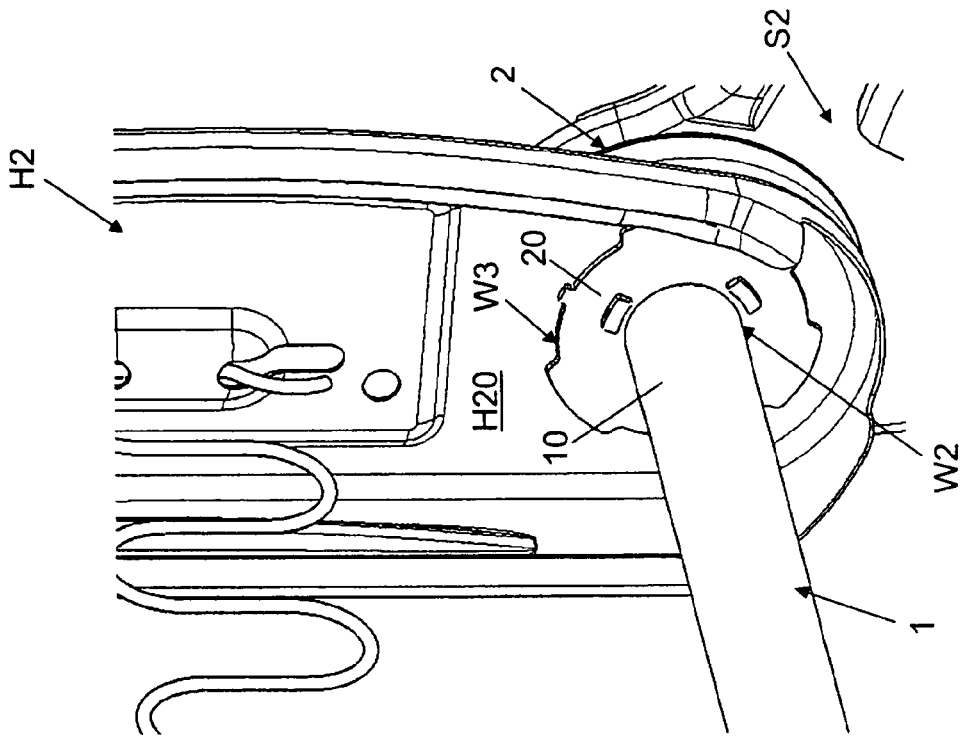
FIG. 3 shows a detail view of a second backrest long side of the motor vehicle seat of FIGS. 1A and 1B, on which a fitting part is welded to a second side bar of the backrest frame and the transverse shaft is welded to this fitting part.
Figure 2C:
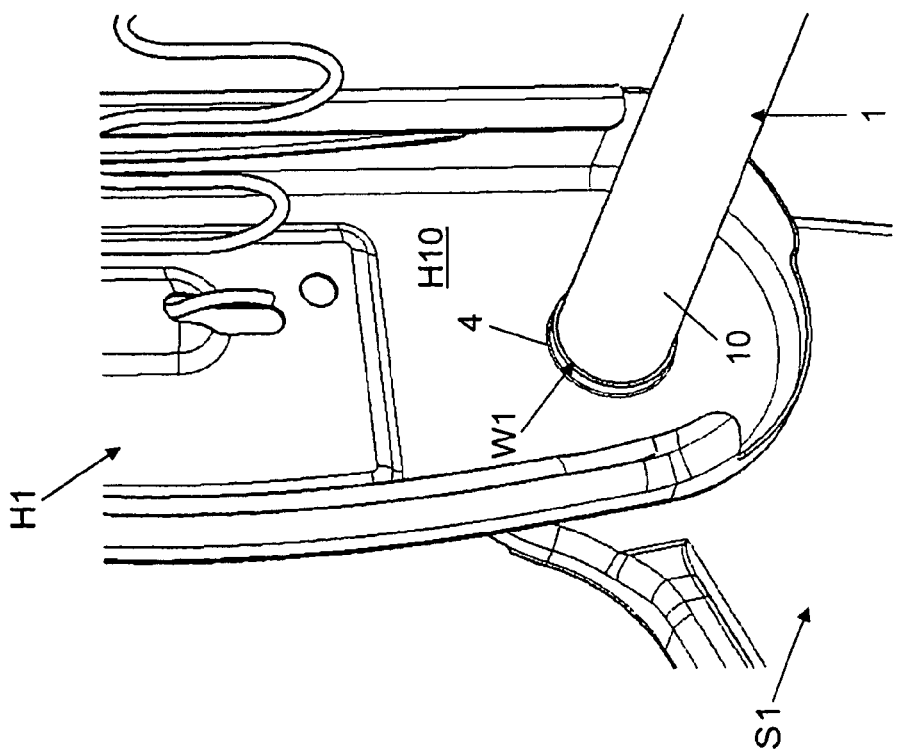

While the two side bars H1 and H2 are rigidly connected with each other via the upper transverse bar Q at their upper end facing away from the seat part S, a transverse shaft in the form of a hollow cylindrical transverse tube 1 with circular cross-section is provided at an opposite end as the only further rigid connection of the two side bars H1 and H2. This transverse tube 1 has two axial ends 11 and 12. Each end 11, 12 each reaches at least up to the associated (first or second) side bar H1 or H2 of the backrest frame of the backrest R or is introduced into the same, wherein here one end 11 is guided out of its side bar 11 and rests in the adjacent seat side part S1 of the seat part S. The transverse tube 1 is rotatably mounted on this seat side part S1, so that it defines a pivot axis D (cf. FIGS. 2A and 2B). The backrest is pivotable about this pivot axis D, in order to be inclined more strongly towards the seat part S or away from the same or to be folded completely onto a seat cushion of the seat part S.

For adjusting the inclination of the backrest R, a fitting arrangement 2 known per se is provided on one (second) of the two side bars H1 and H2. Via this fitting arrangement 2 an adjustment of the inclination of the backrest R relative to the seat part S is permitted, in order to pivot the backrest R into an adjustment direction V. At the same time, an arrestment of an adjusted relative position of the backrest R relative to the seat part S is provided via the fitting arrangement 2, so that an inadvertent displacement of the backrest R adjusted in its inclination relative to the seat part S is prevented. The fitting arrangement 2 here includes two fitting parts, of which one fitting part 20 is fixed at the backrest frame and one fitting part (not shown) is fixed at a seat side part S2.

As can be taken in particular from the detail representations of FIGS. 2A to 2C and 3, the transverse tube 1 is non-rotatably connected with the two side bars H1 and H2 of the backrest frame to permit a swivel movement of the backrest R and to reinforce the backrest R. The connection of the transverse tube 1 to a first side bar H1 is effected directly via a welding seam W1. On the opposite second side bar H2 a welded connection of the transverse tube 1 with the fitting part 20 of the fitting arrangement 2 is provided along a welding seam W2. The fitting part 20 itself likewise is fixed at the second side bar H2 via a welded connection along a welding seam W3.

The disk-like fitting part 20 here is located on a planar bar inner surface H20 of the second side bar H2 facing the opposite first side bar H1. The fitting part 20 fully rests on the bar inner surface H20 and at its circumferential edge is welded to the second side bar H2 via the at least one welding seam W3. The welding seam W3 can be formed to fully extend around the circumference of the fitting part 20. Alternatively, it is also possible that individual welding seams spaced from each other along the circumference of the fitting part 20 are provided, in order to locally cohesively connect the fitting part 20 with the side bar H2, and/or the fitting part 20 can be welded to the side bar H2 via a fitting portion, which is formed on a bar outer surface of the second side bar H2 facing away from the first side bar H1.

In an alternative embodiment, a (disk-like) fitting part of a fitting arrangement welded to the transverse shaft or the transverse tube 1 also can be arranged on the bar outer surface of the second side bar H2 facing away from the first side bar H1 and be welded to the second side bar H2 on this bar outer surface.

The transverse tube 1 likewise can cohesively be connected with the fitting part 20 via an individual, radially extending welding seam W2 or via several individual welding seams spaced from each other on the circumference.

The first side bar H1 opposite the fitting part 20 likewise forms a planar bar inner surface H10 which faces the opposite second side bar H2. On the bar inner surface H10 of the first side bar H1 a rim hole 4 is formed. In the present case, this rim hole 4 has a circular cross-section and encloses an opening through which the transverse tube 1 with its one end 11 is guided through the first side bar H1. A narrow tab of the rim hole 4 axially protrudes from the bar inner surface H10 of the first side bar H1 in direction of the opposite second side bar H2. At this protruding tab of the rim hole 4 the transverse tube 1 is welded to the side bar H1 on its outer shell surface 10 along the welding seam W1. The transverse tube 1 thus is non-rotatably connected with the two side bars H1 and H2 on the two mutually opposite bar inner surfaces H10 and H20; on the one hand with the first side bar H1 directly and on the other hand with the second side bar H2 via the disk-like fitting part 20 of the fitting arrangement 2, which has a thickness of only few millimeters. The connection each is effected exclusively via welded connections (welding seams W1, W2 and W3) and hence exclusively cohesively, in order to achieve a non-rotatable connection of the transverse tube 1 with the two side bars H1 and H2.

The ends of the side bars H1 and H2 connected with the transverse tube 1 are arranged between the two seat side parts S1 and S2. One end 11 of the transverse tube 1 protruding from an opening in the first side bar H1 is rotatably accommodated in a (bearing) opening 3 of the associated seat side part S1 and hence defines the pivot axis D (together with the fitting arrangement 2). The other end 12 of the transverse tube 1 exclusively is fixed at the fitting part 20, which for arresting the backrest R cooperates with the further fitting part of the detent fitting of the fitting arrangement 2, which is fixed at the associated seat side part S2.

Due to the non-rotatable connection of the transverse tube 1 with the backrest frame, which here is formed by the side bars H1, H2 and the upper transverse bar Q, via welding seams W1, W2, W3 in the interior of the backrest frame the assembly time is shortened considerably. In addition, a flux of force between the transverse tube 1 and the two side bars H1 and H2, in particular for transmitting a swivel movement to the backrest R via the fitting arrangement 2 and for introducing the high forces and torques occurring at the backrest R during a crash into the transverse tube 1, is improved distinctly.

In addition, due to the disk-like formation of the fitting part 20, an axial offset between the welded connection W3 of fitting part 20 and second side bar H2 on the one hand and between the welded connection W2 of fitting part 20 and transverse tube 1 on the other hand is avoided. Furthermore, due to the existing radial offset of the welded connections W2, W3 a force to be transmitted from the second side bar H2 or the backrest frame to the transverse tube 1, or a torque to be transmitted, is passed over the planar portions of the fitting part 20 extending radially in direction of the transverse tube 1. Before being introduced into the transverse tube 1, the force or the torque thereby are guided over a region at the side bar H2 equipped with the fitting part 20 in direction of longitudinal extension of the backrest frame along the backrest frame, which is reinforced by the fitting part 20. This has a positive effect in particular in the case of a crash, when a torsion of the backrest R should be counteracted by the reinforcing transverse tube 1 and the connection between transverse tube 1 and the backrest frame is subjected to a particular load. In the illustrated asymmetric design of the backrest R with a fitting arrangement 2 only provided at one side bar H2 the focus particularly is on the avoidance or at least limitation of such torsion of the backrest R in the case of a crash.

Figure 4:
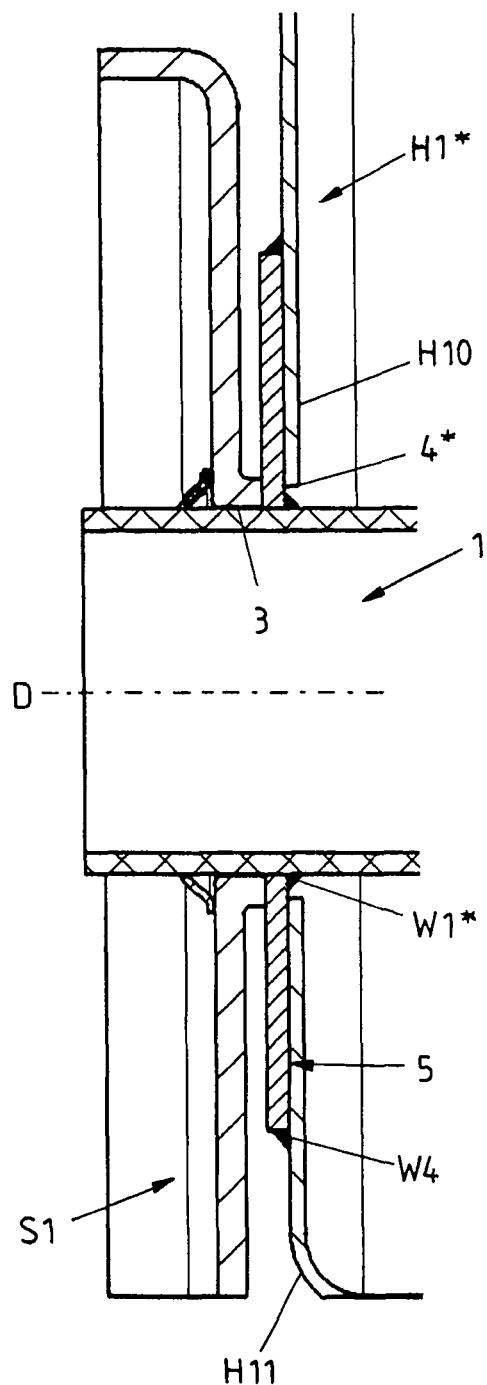
FIG. 4 shows a detail view of a first backrest long side of a modified design variant, in which the transverse shaft is fixed at the first side bar via a separate connecting element.

With the sectional representation of FIG. 4 an alternative formation of the motor vehicle seat K is illustrated. In this variant, the transverse tube 1 is not directly welded to a first side bar H1*, but is fixed at this first side bar H1* via a connecting element 5 formed as disk. Due to the disk-like formation of the connecting element 5, similar advantages are achieved with regard to the introduction of force into the transverse shaft 1—in particular in the case of a crash—, as they are explained above for the disk-like formation of the fitting part.

The first side bar H1* of FIG. 4 here includes a through opening 4* through which the transverse shaft 1 is guided, so that with one end it is rotatably accommodated in the opening 3 of the outer seat side part S1. The connecting element 5 likewise includes a through opening through which the transverse shaft 1 extends and is welded to the same via a welding seam W1* on the shell surface 10 of the transverse shaft 1. The connecting element 5 is located on a bar outer surface H11 of the first side bar H1* between the seat side part S1 and the first side bar H1* and is welded to the first side bar H1* via a welding seam W4 on this bar outer surface H11.

The dimensions of the through opening 4* of the first side bar H1* (or here the diameter of the through opening 4*) is/are chosen such that the connecting element 5 arranged on the outside also is accessible from the inside of the first side bar H1* at least in the region of the through opening 4*. Thus, a portion of the connecting element 5 enclosing the transverse shaft 1 on the inside of the first side bar H1* can be welded to the transverse shaft 1, when the rotatably mountable end 11 of the transverse shaft 1 is properly guided through the through opening 4* of the first side bar H1* and the through opening of the connecting element 5. Hence, the transverse shaft 1 here is welded to the connecting element 5 on an inside of the first side bar H1*, through which the same extends, facing the second side bar H2, and the connecting element 5 is welded to the first side bar H1* on an outside of the first side bar H1* facing away from the second side bar H2.

Alternatively or in addition, it can in particular be provided for example to weld the connecting element 5 to the transverse shaft 1 on the outside of the first side bar H1*.

The invention claimed is:

1. A seat comprising a seat part and a backrest pivotally mounted relative to the seat part, the backrest including a backrest frame with two mutually opposite side bars, wherein the two side bars are connected with each other via a transverse shaft which is rotatably mounted on the seat part in the region of a side bar, and wherein at least one fitting arrangement with a fitting part fixed at the backrest frame is provided wherein the at least one fitting arrangement is configured to arrest the pivotally mounted backrest relative to the seat part, wherein the fitting part fixed at the backrest frame is welded to one of the side bars and the transverse shaft is welded to this fitting part, and an end of the transverse shaft remote from the fitting arrangement extends through another one of the two side bars and this end is rotatably mounted in a seat side part of the seat part, so that the transverse shaft defines a pivot axis about which the backrest is pivotable relative to the seat part, the transverse shaft itself serving as a bearing for pivotably mounting the backrest on the seat side part of the seat part remote from the fitting arrangement.

2. The seat according to claim 1, wherein the fitting part is formed disk-like.

3. The seat according to claim 2, wherein the fitting part is formed disk-like and connected with the transverse shaft such that a welding seam for connecting the fitting part with the associated side bar substantially lies in the same plane as a welding seam for connecting the transverse shaft with the fitting part.

4. The seat according to claim 1, wherein the transverse shaft is fixed at the side bar reached through which the transverse shaft extends.

5. The seat according to claim 4, wherein the transverse shaft is welded to at least one of the side bar through which the transverse shaft extends and a connecting element fixed at this side bar.

6. The seat according to claim 5, wherein the transverse shaft is introduced into a rim hole formed at the one side bar and is welded to the rim hole.

7. The seat according to claim 5, wherein the connecting element is welded to the side bar.

8. The seat according to claim 7, wherein the transverse shaft is welded to the connecting element on an inside of the side bar, through which the transverse shaft extends, the inside of the side bar facing the other side bar, and that the connecting element is welded to this side bar on an outside of the side bar, through which the transverse shaft extends, the outside facing away from the other side bar.

9. The seat according to claim 5, wherein the transverse shaft is welded to the fitting part welded to the one side bar and, in each case each on the inside of a side bar facing the other side bar, to at least one of the opposite side bar and the connecting element of the opposite side bar.

10. The seat according to claim 5, wherein the transverse shaft is welded to at least one of the side bar through which the transverse shaft extends and the connecting element of this side bar on an outside of the side bar, through which the transverse shaft extends, the outside facing away from the other side bar.

11. The seat according to claim 5, wherein the transverse shaft is welded to at least one of the one side bar and the connecting element via a single welding seam or several welding seams spatially spaced from each other.

12. The seat according to claim 11, wherein the transverse shaft is welded to at least one of the one side bar and the connecting element via a single radially extending welding seam.

13. The seat according to claim 1, wherein the transverse shaft is welded to the fitting part via a single welding seam or several welding seams spatially spaced from each other.

14. The seat according to claim 13, wherein the transverse shaft is welded to the fitting part via a single radially extending welding seam.

15. The seat according to claim 1, wherein in addition to the transverse shaft the two side bars also are rigidly connected with each other via an upper transverse bar at which a headrest is to be fixed.

16. The seat according to claim 1, wherein the transverse shaft is formed as hollow transverse tube.

17. The seat according to claim 1, wherein the at least one fitting part is part of at least one of a detent fitting of the fitting arrangement, by means of which a swivel movement of the backrest relative to the seat part is blocked and can be released by actuating an actuating element, and of a rotary fitting of the fitting arrangement, by means of which an inclination of the backrest relative to the seat part can be adjusted.

* * * * *